UNITED STATES PATENT OFFICE.

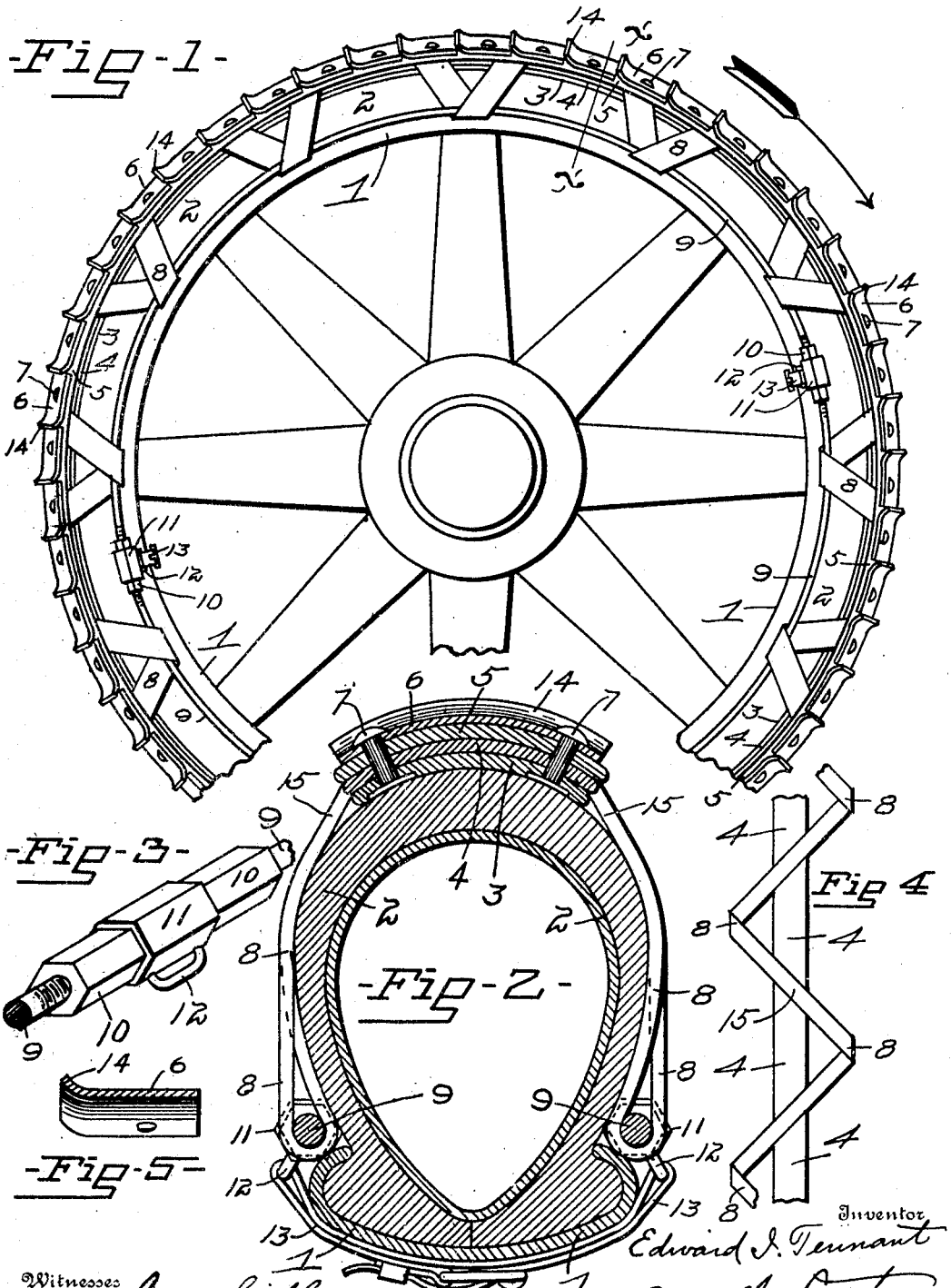

EDWARD I. TENNANT, OF SPRINGFIELD, OHIO.

PNEUMATIC-TIRE PROTECTOR.

No. 849,438.     Specification of Letters Patent.     Patented April 9, 1907.

Application filed May 8, 1906. Serial No. 315,719.

*To all whom it may concern:*

Be it known that I, EDWARD I. TENNANT, a citizen of the United States, residing at Springfield, in the county of Clark and State of Ohio, have invented certain new and useful Improvements in Pneumatic-Tire Protectors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in pneumatic-tire protectors.

The object of the invention is to provide means whereby a pneumatic tire is rendered puncture-proof and the life of the tire is greatly augmented.

It also provides means whereby skidding is prevented to a great extent.

One of the advantages I claim for my invention is that the protector only covers the tread of the tire, the sides being left exposed, thereby preventing the tire from heating, which is very detrimental to the rubber.

Referring to the drawings, Figure 1 is a side elevation of an automobile-wheel equipped with my new pneumatic-tire protector. Fig. 2 is a section on the line $x\ x$ of Fig. 1. Fig. 3 is a detail of the turnbuckle-holding mechanism. Fig. 4 is a detail showing the construction of the flexible loops. Fig. 5 is a sectional detail of one of the metallic plates placed on the periphery of the tire-protector.

Throughout the specification similar reference characters indicate corresponding parts.

Referring to the drawings, 1 represents a rim of a wheel, upon which is mounted in any suitable manner a pneumatic tire 2. Extending around the outer surface of said tire is an endless band of elastic material 3. This elastic material may be made of leather, rubber, or cloth. Extending around the tire above said band 3 is an endless band 15, which is placed in a zigzag line, as shown in Fig. 4. As will be seen from the drawings, this band forms loops 8 on each side of the band 3. The object of these loops will be hereinafter described. Extending above the band 15 is a band 5, similar to the band 3. These bands 3, 5, and 15 are of the desired thickness to impart the necessary strength. The intervening space between the bands 3 and 5, which is formed by the band 15 crossing said bands, is filled in with strips of suitable material 4, which are of the shape shown in Fig. 4. The ends of the pieces 4 are cut on a taper to match the sides of the endless band 15, which is laced over the elastic band 3. The said pieces 4 are then placed in position to fill the spaces between the band 15 in crossing.

Mounted on the outer band 5 are a suitable number of metallic plates 6, which are held in place by rivets 7. These plates are so shaped that they will cause any object they may strike to glance off. These rivets 7 extend through the bands 3, 5, and 15 and the strips 4 and serve to hold the said bands rigidly together. The plates 6, each having at one edge an upturned portion 14, produce a roughened surface on the face of the tire-protector, and thereby prevent skidding, which is very detrimental to pneumatic tires on automobiles and is especially valuable in case of ice. The direction in which the wheel rotates is shown by the arrow in Fig. 1, and it will be seen that it will be impossible for the upturned edges 14 to gather mud. When the protector is placed on the tire, the loops 8, formed by the bands 15, lie flat against each side of the tire. A ring 9 is passed through said loops 8 and is tightened by turnbuckles 10. To prevent the turnbuckles 10 from unloosening, I provide a sleeve 11, having a loop 12 thereon. This sleeve is passed over the turnbuckle after it is sufficiently tightened. A strap 13 is then passed through the loop 12 and also through a similar loop on the opposite side of the tire. It will be seen that by this means it will be impossible for the turnbuckles to become unloosened.

I claim—

1. In a tire-protector, a tire, an elastic tread-band inclosing the tread portion of said tire, a band of fabric material crossing said elastic tread-band and forming loops on each side of the tire, a series of strips of fabric covering the elastic band at points between the cross-band and filling the spaces between the cross-band, rings passing through the loops formed by the cross-band, and means for contracting said rings to tighten the cross-band.

2. In a tire-protector, a tire, an elastic tread-band inclosing the tread portion of said tire, a band of fabric material crossing said elastic tread-band and forming loops on each side of the tire, a series of strips of fabric covering said elastic band at the points between the cross-band and filling the spaces between said cross-band, and a series of metallic plates inclosing the cross-band and the strips filling the spaces between the cross-band.

3. In a tire-protector, a tire, an elastic tread-band inclosing the tread portion of said tire, a band crossing said elastic tread-band and forming loops on each side of the tire, a series of strips of fabric covering said elastic tread-band at the points between the cross-band and filling the spaces between said cross-band, and an elastic band inclosing the cross-band and the strips filling the spaces between the cross-band.

4. In a tire-protector, a tire, an elastic tread-band inclosing the tread portion of said tire, a band crossing said elastic tread-band and forming loops on each side of the tire, a series of strips of elastic fabric inclosing said elastic tread-band and filling the spaces between the cross-band, and an outer elastic band inclosing the cross-band and the strips filling the spaces between the cross-band.

5. In a tire-protector, a tire, an elastic tread-band inclosing the tread portion of said tire, a band of fabric material crossing said elastic tread-band and forming loops on each side of the tire, strips of fabric material covering the elastic tread-band at points between the cross-band, a tread-band inclosing the cross-band and the pieces filling the spaces between said cross-band, and a series of metallic plates secured to said outer tread-band.

In testimony whereof I affix my signature in presence of two witnesses.

EDWARD I. TENNANT.

Witnesses:
CAROLYN M. THEOBALD,
MATTHEW SIEBLER.